Patented Jan. 26, 1943

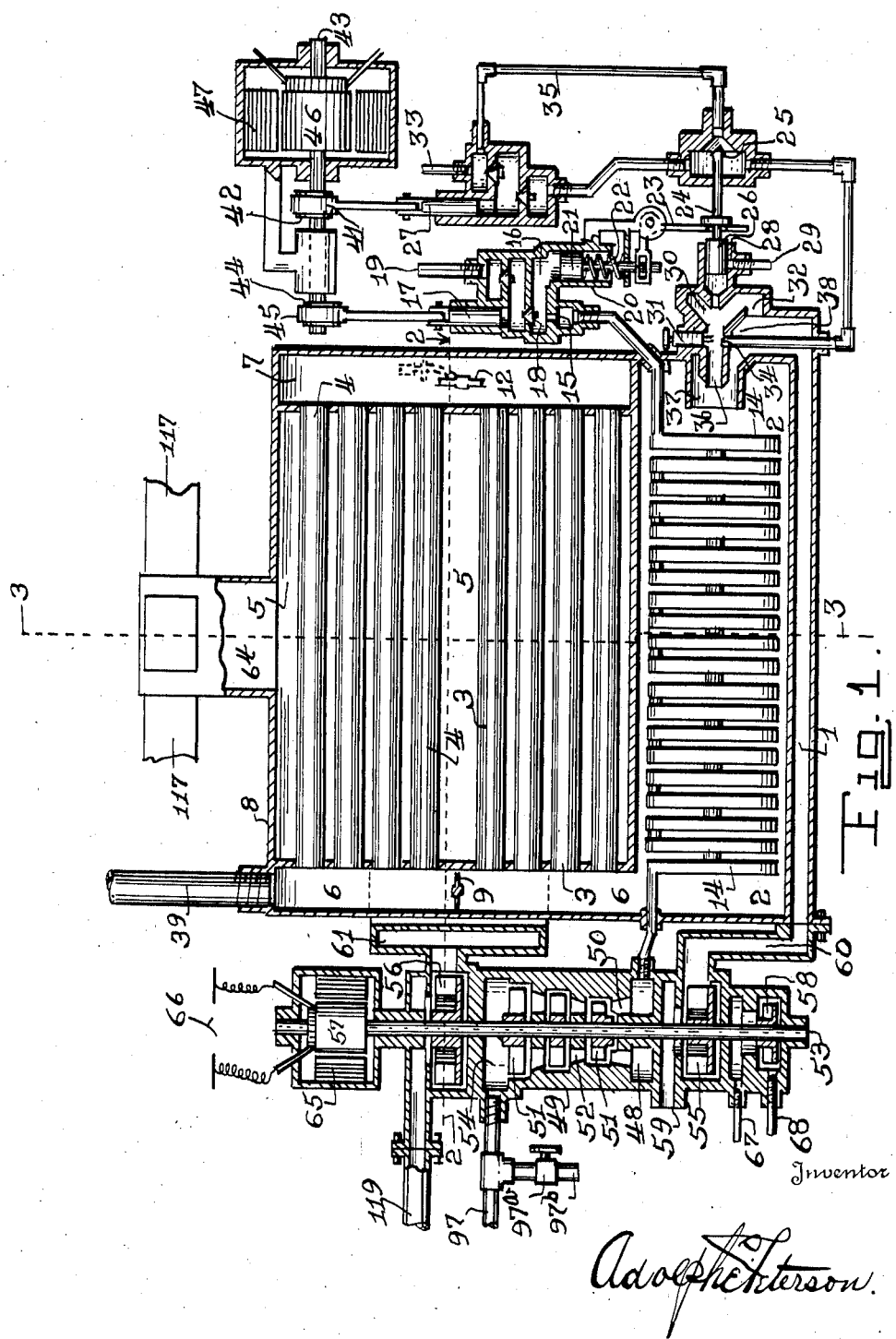

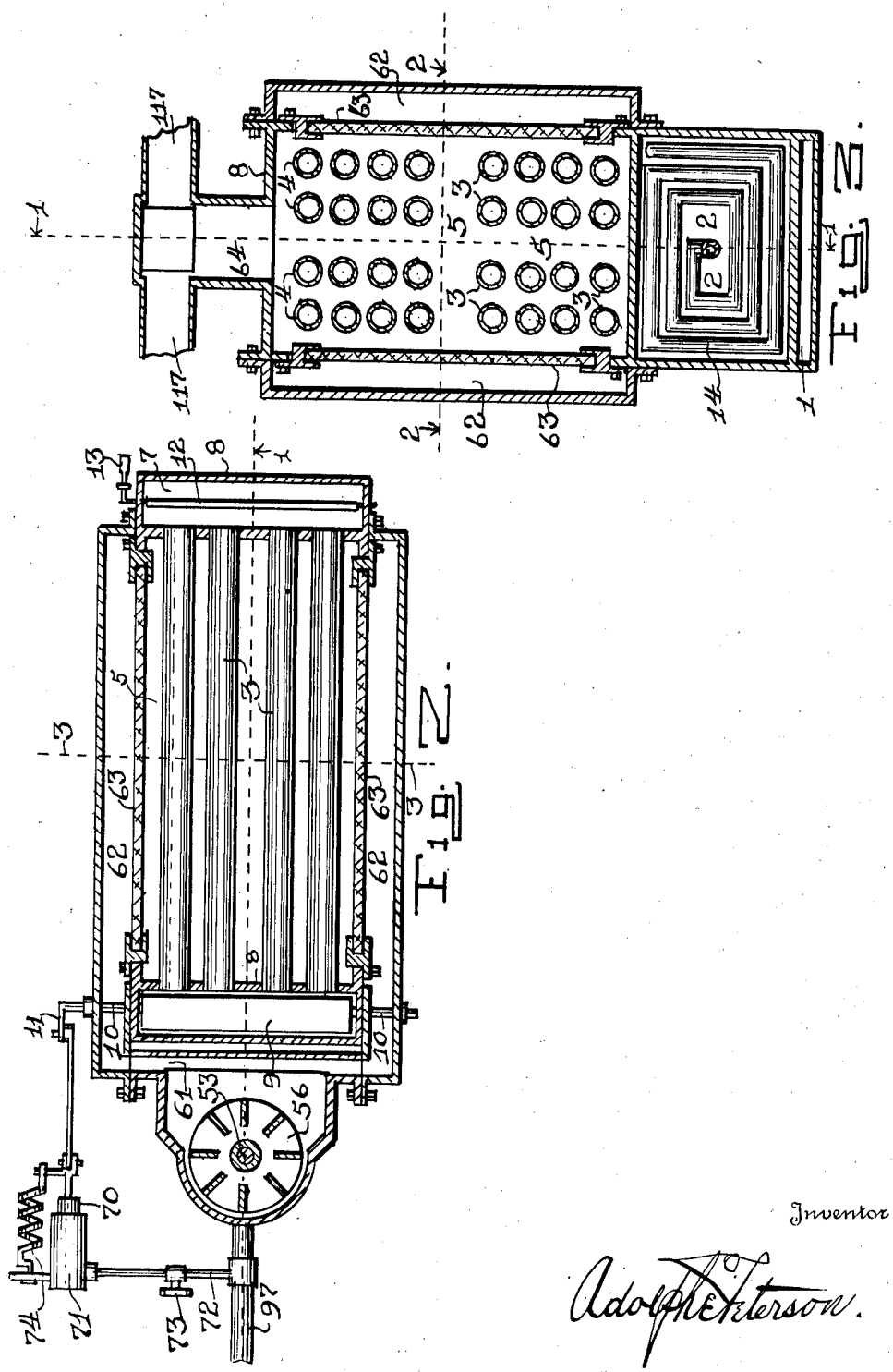

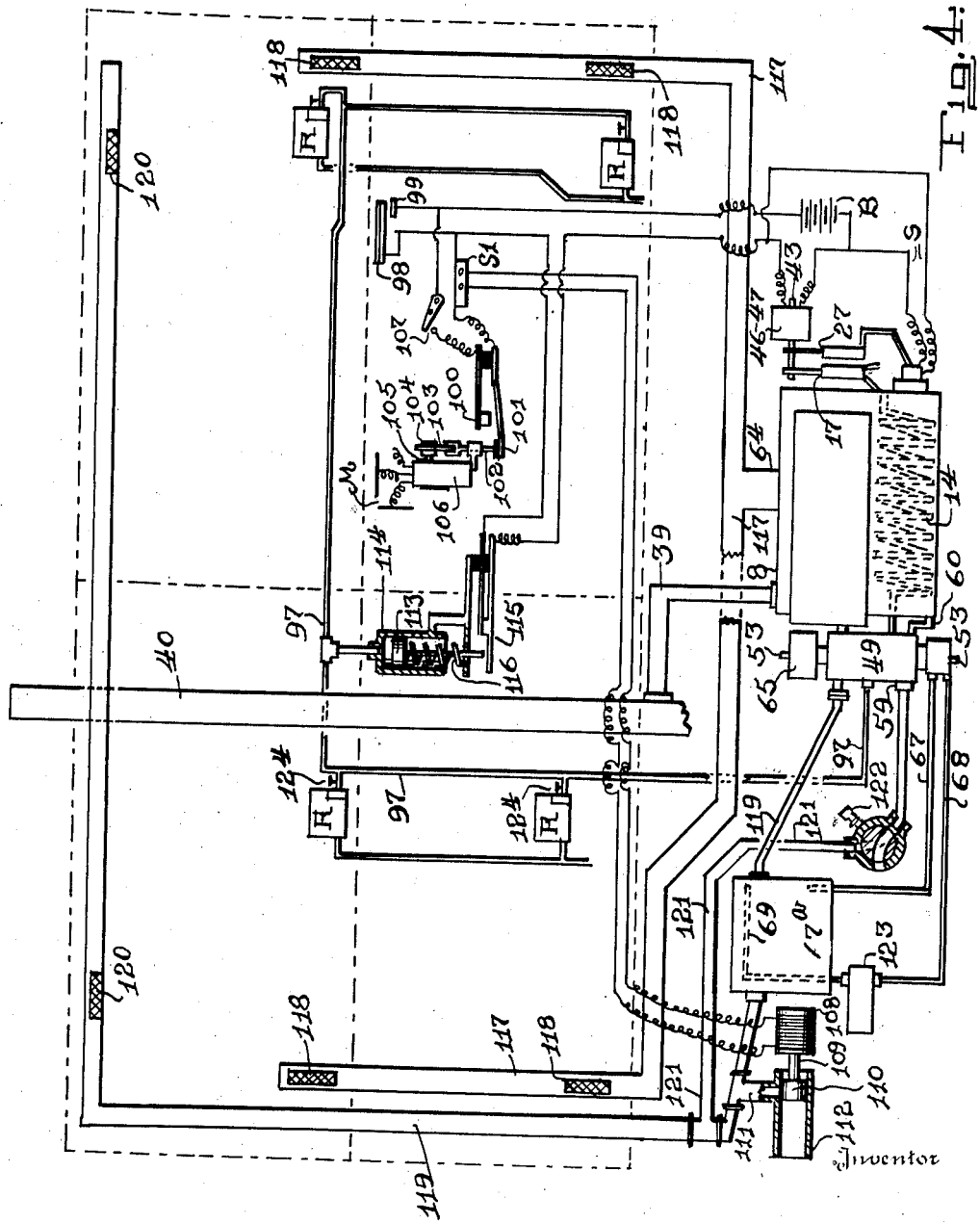

2,309,356

UNITED STATES PATENT OFFICE 2,309,356

AUTOMATIC HEATING AND VENTILATING MEANS

Adolphe C. Peterson, Minneapolis, Minn.

Application November 15, 1937, Serial No. 174,647

25 Claims. (Cl. 237—1)

My invention relates to heating means and ventilating or air conditioning means or buildings and is therefore called automatic heating and air conditioning means, since it is substantially automatic in its operation.

The principal objects of my invention are to provide a form of heating and air conditioning means with ventilating means which will be simple in its construction, efficient in its operation and relatively cheap in its manufacture. An object is to provide a form of heating means which shall efficiently use a combination of both steam and air heating and which will therefore by its combination of heating methods provide more rapid heating of a building, also more efficient utilization of the heat in the fuel consumed. An object is to provide a form of heating means with air conditioning or ventilating which shall employ as its motive agent for the movement of air in conduits steam which is generated in the heating operation and which will therefore efficiently use the heat and provide ventilation or air conditioning without an expensive use of electricity for the operation of blowers and other motive agents. An object is to provide a form of heating and air conditioning means which will automatically provide periodic ventilation for a building such as a residence without manual attention therefor and without undue subjection of the interior of the building to cold air. An object is to provide a form of ventilation for residence use, which automatically achieves that object without a need for opening of windows and without expenditure of a considerable sum for electricity or power to drive the ventilation means. An object is to provide a form of control means for such apparatus, particularly for the fuel delivery which shall be simple and automatic in operation, and which shall at the same time provide automatically or inherently against damage to the apparatus by improper functioning of the heating and fuel utilization.

An object is also to provide a form of heat utilization means for residential or building use which shall also by its system of heat utilization provide simple means for provision of electric current for such small building or residential use and which may therefore in conjunction with other means such as batteries provide immunity of such buildings from the usual community or municipal electric distribution system and which will accordingly provide further economy in the utilization of heat in such buildings. In general the object is to provide improved heat utilization and provision in residential and building construction.

The principal devices and combinations of devices which comprise my invention are as hereinafter described and as defined in the claims.

In the accompanying drawings which illustrate my invention, like characters refer to like parts throughout the several views.

Referring to the drawings:

Figure 1 is a view in vertical cross section through the main heat and power unit used with my system and provided as a part thereof, this section being on the lines 1—1 of Figures 2 and 3, and some parts being in full side elevation.

Figure 2 is a view chiefly in horizontal cross section on the lines 2—2 of Figures 1 and 3, some parts being in full plan view, the pumping means at the right of Fig. 1, not being shown in Fig. 2.

Figure 3 is a view chiefly in vertical cross section at right angles to the sections of Figures 1 and 2, this section being on the lines 3—3 of Figures 1 and 2, some parts being shown in full side elevation.

Figure 4 is a diagrammatic view showing the use of my main heat and power unit in a building, the building being shown merely diagrammatically by dot-dash lines, these lines showing also the subdivision of the building in rooms on a vertical cross section through the building, this view showing also some of the control devices in detailed section through these particular control devices.

There is first described the main unit which is a power and heat unit.

Referring first to the figures from 1 to 3 both inclusive, the numeral 1 indicates an air conduit at the bottom of a casing, this conduit being shallow in depth, 2 a fire chamber, 3 a lower set of fire tubes, 4 an upper set of fire tubes, all the fire tubes passing through an air heating chamber 5, and 6 and 7 indicate vertical flues at the front and rear ends of the casing 8 wherein all of these designated parts are formed. The parts designated are preferably constructed of sheet steel or alloy and formed by welding the steel or metal together. The fire tubes are in tiers as shown and all lie horizontally and parallel to the lower fire chamber 2. There are in the Figures 1 and 2 as shown approximately twenty of these tubes 3 and twenty of these tubes 4.

The vertical flue 6 is normally divided by a horizontal wall 9 at a point so that tubes 3 at this end are isolated from tubes 4 as far as concerns vertical flue 6, but this wall is constructed in the form of a long and flat damper having an axle shaft 10 and lever 11 outside of the casing 8, the shaft 10 being oscillatably mounted in bearings in the casing 8. Likewise vertical flue 7 has a damper 12 placed therein horizontally which has a hand lever 13 outside of the casing 8 by means of which that damper 12 may be placed horizontally when desired, particularly for summer use of the heat unit and power unit, but this damper 12 is normally placed vertically in the ineffective position as shown so that the fire gases may pass through vertical flue 7 without restriction from adjacent ends of fire tubes 3 to adjacent ends of fire tubes 4.

Within the fire chamber 2 there is placed a pipe coil 14 which has considerable heating surface exteriorly and is internally of a diameter to permit a flow of vaporized fluid (at its delivery end) equivalent to that used under operating conditions. This flow may be a rapid flow, and is such that the heating coil 14 constitutes a flash or semi-flash boiler of substantially the type such as has been used in automobile engine boilers of the steam type. (It is to be noted however that there may be combined with this pipe coil a more capacious boiler for initial heating at least of the water liquid or fluid, but preferably this semi-flash or flash pipe coil 14 is used so that there is not too large a capacity of water in the boiler.)

The reception or water end of the pipe coil 14 is adapted to receive liquid water through a somewhat restricted orifice 15 from a small water chamber 16 to which a water pump 17 delivers past a check valve 18. The water pump 17 receives liquid water past a check valve from a supply pipe 19. The water chamber 16 which under operation is subject to the pressure of water delivery and steam generation in pipe coil 14, has subject thereto, opening thereto, a cylinder 20 in which is pressure responsive piston 21, the latter normally yieldably pressed inward by spring 22. The pressure responsive piston 21 by its rod as shown is connected flexibly with a bell-crank 23, the latter by the opposite crank member coacting with a valve stem 24. The valve stem 24 at one end has needle valve 25 and at the other cylindrical valve 26, the former being a liquid fuel by-pass valve and the latter a gas valve.

The liquid fuel by-pass valve 25 will be in the open position permitting by-passing of liquid fuel from the liquid fuel pump 27 except when piston 21 is moved outwardly by sufficient pressure in water chamber 16 and the same condition will cause the gas-valve 26 to assume the position permitting opening of the gas port 28 so that gas such as gas from a gas-main supply will flow from the gas main 29 or gas supply to which that is connected into the small combustion chamber 30 into which protrudes an ignition element 31 (spark or incandescent) and into which also delivers the small air ports 32 connecting with air conduit 1.

The liquid fuel pump 27 delivers liquid fuel as pumped from supply pipe 33 by the check valves shown to the liquid fuel nozzle 34 (except when by-pass 35 is opened by needle valve 25, and the nozzle 34 delivers into the stream of combustion gases issuing from combustion chamber 30 through its orifice 36 to the larger tubular nozzle 37, the latter constituting somewhat of a Venturi tube. Into the latter deliver the larger air ports 38 also connecting with air conduit 1. The tubular nozzle 37 delivers directly to the fire chamber 2 wherein is located the pipe coil 14 and the gases pass through or about the pipes of that coil to the vertical flue 6, thence through fire tubes 3, thence through fire tubes 4, thence to flue or smoke pipe 39 to chimney 40 shown in the diagrammatic figure.

The liquid fuel pump 27 is by eccentric rod 41 operated by eccentric 42 on motor shaft 43. An eccentric 44 on the same motor shaft reciprocates eccentric rod 45 and thus water pump 17. The motor shaft 43 is revolved by electric motor armature 46 and motor fields 47, when a circuit through the motor is completed as hereinafter described. The liquid fuel pump and water pump have a definite proportion or capacity under operation condition with each other and with the gas supplied from the gas main.

The pipe coil 14 delivers at the delivery end to a turbine nozzle chamber 48 in a turbine casing 49, and the nozzle chamber 48 delivers through direction vanes 50 to the first turbine vane wheel 51 and thence in succession and alternation to the reaction vanes 52 and the other turbine vane wheels 51 all of the latter being fixed to revolve with turbine shaft 53. The last delivers to turbine outlet chamber 54.

The turbine shaft 53 has fixed on it below a furnace air blower 55, and above that an air conditioner blower 56, so-called, and on the extreme upper end a generator armature 57 and on the extreme lower end the water pump wheel 58 of the rotary type, vane type. The furnace air blower receives atmospheric air from house or outside through inlet 59 and delivers through pipe 60 to air conduit 1, thence to the combustion chambers. The air conditioner blower 56 receives house or building air from the register conduits as hereinafter described and delivers the air to a split conduit 61, thence to air chambers 62 (shallow and wide) at opposite sides of casing 8, thence through fabric or other type cleaner screens 63, thence to air heating chamber 5 about the fire tubes 3 and 4, thence to the heating chamber outlet 64, thence to the warm air house conduits, as hereinafter described.

The generator armature 57 revolves within fields 65 and may be used to generate electric current and delivers to main house lines or battery supply lines 66, if it is desired to be used for that purpose. The water vane wheel or pump 58 draws water from the lower part of an air washing chamber 67a by conduit 67 and delivers by conduit 68 back to water sprays 69, the latter diagrammatically shown only. The water vane pump 58 operates at very light pressure and should be made to so operate, and therefore consumes very little power. This water vane pump 58 may however be omitted and other types of air washing and humidifying devices used in the air system.

The damper 9 by its lever 11 is adapted to be closed by piston 70 whenever there is pressure of steam in the cylinder 71 from conduit 72 and turbine outlet chamber 54, but this cylinder 71 may be closed thereto by hand valve 73 (normally open). Damper 9 except under conditions of light steam pressure is opened by spring 74 thus opening the flue 6, and permitting by-passing of fire tubes 3 and 4, this is only under starting conditions when air flow by heat condition only may be used for initial heating, the air passages being continuously open for this purpose. The cylinder 71 may be subjected to the pressure at any point in the steam line.

In the diagrammatic view Figure 4 there are shown individual radiator units designated R, which radiator units may be any type of the commonly known steam radiator units which are well known and used, and such as pass steam through them from a steam delivering conduit and discharge the steam to any discharge conduit. Such radiator units R may be the commonly known radiator means or any means such as may be adapted for use in the association shown.

Having described the main heat and power unit and one of the radiator units of which a number may be used in a system, I proceed now to description of the controls used with the system. The system is subject to two main controls either of which is or may be used without the other in a system, but preferably both are used. Thermostatic type control 98 will permit current flow through circuit of motor 46—47 and battery B (or main line system) by contact with contact 99 whenever the temperature in the house or control position diminishes below a predetermined figure as 72 degrees Fahrenheit. This control will be broken whenever that temperature is exceeded. Making of that connection causes current flow to motor 46—47 and shunt S to ignition element 31.

The circuit may also be made through a secondary control constituted by rigid contact 100 and spring contact 101, these subject to make and break periodically, every hour for a period of ten or more minutes, or less, by rod 102, the latter reciprocated by eccentric rod 103 on eccentric 104, the latter revolvable with shaft 105 of electric clock 106, the latter operated by main line electric system M, the electric impulses driving a motor in clock 106 at unvariable speed, in a commonly known manner. Shaft 105 may be a minute hand of that clock and revolve every hour or it may have other motivation by the clock so that a regular revolution and accordingly periodic thrust of spring contact 101 away from rigid contact 100 is effected, this contact period depending on the adjustment, and thereby the periodic ten minute or thereabout periodic making of the circuit is secured. This circuit making means may be disconnected by hand switch 107. There is included in this supplementary circuit, breakable by clock 106, a shunt S1 which will simultaneously convey current to a solenoid 108 which will under excitation (in the period determined by clock 106) pull armature 109 into it and thereby pull valve 110 to open conduit 111 to atmospheric opening 112 to outside or fresh air, and thus permit entry of fresh air to the house air system. Armature 109 is returned by a spring (not shown) within solenoid 108.

The circuits are however subject to a positive control for breaking the circuit through motor 46—47, and thus stopping action, by means of a pressure responsive piston 113 in cylinder 114, the latter subject to pressure in the house steam line 97. The pressure piston 113 may break the contacts 115 and thus stop generation action, whenever steam pressure in the house main exceeds say five or ten pounds or whatever pressure may be determined upon as a suitable house main pressure for delivery to the house radiator units. This contact 115 will normally however remain closed, thus permitting control through the other controls; spring 116 normally returning the piston 113 to permit remaking of contact by contacts 115.

Air heating chamber 5 by conduit 64 delivers to house warm air conduits 117 and warm air registers 118 in individual rooms. Blower 56 by house cold air conduit 119 may draw cold air from the house rooms by registers 120, but in this conduit a washing and humidifying chamber 67a is interposed where the air may be washed and humidified as necessary and if desirable. Water for that purpose would be maintained in the chamber 67a to a shallow depth therein, but not so much as to obstruct passage of air therethrough.

The house cold air conduit may deliver by a by-pass conduit 121 to the furnace air blower chamber 59 and thence pass that cold air through the furnace to outside air by way of the smoke stack 40, but that is done only if the hand valve 122 is so stationed as to permit that passage. The hand valve 122 as shown is stationed to permit the furnace blower to draw air directly to the furnace from the room or basement where it is stationed. In case the valve 122 is stationed the other way the house cold air registers deliver partly under the suction effect of the blowers in the main power unit to the furnace combustion chamber and partly to the heating chamber 5. During intervals when valve 110 is pulled by its solenoid 108 to open fresh air inlet port 112 (which is located outside the building) the suction of the blower 56 will principally draw this outside fresh air as the conduit 119 and its registers would present the greater friction, but it is to be understood that if desirable the armature 109 may also be adapted to close the house conduit 119 so that all fresh air comes from inlet port 112. While I especially show no exit for house air except the passage to the furnace chamber, house air will pass out any outlets in a house, or such as a house usually has, if fresh air is drawn from inlet port 112. A cooling means 123 may be interposed in the washing water conduit 68 and operated as desired to cool the washing water for the air chamber 67a. Each individual radiator heat unit has a steam control hand valve 124. Valve 97a and pipe 97b provide for use of steam in any utility means.

When the apparatus is not functioning and becomes cold, and there is consequently no steam pressure in the steam conduits, the spring 74 will by lever 11 draw damper 9 into the open position or non-obstruction position and thus flue 6 will by-pass combustion products directly to the discharge stack or vent from the combustion chamber 2, after however the combustion products have passed and heated coil 14. Thus in this condition when fuel gaseous or liquid or gaseous and liquid issues into nozzle 36 this fuel, of which a part is gaseous or atomized will draw air freely from passage 1 and 59 from atmosphere, as there is no obstruction to this flow by the blower 55, and thus this inspirated air will support combustion during an initial or preheating period, the heating of combustion products by heat displacement causing the products to readily flow upwardly through flue 6 directly to the discharge vent or stack without hindrance of the flues 3 and 4. Thus there is then free passage of the combustion products upwardly, and the combustion will quickly heat the coil 14 to produce steam generation therein. When that is consummated the pressure of steam will cause piston 70 to draw the valve or damper 9 into the closed position whereupon the combustion products pass successively through flues 3 and 4 to the discharge vent instead of passing directly thereto from chamber 2. The increased steam pressure now suffices to operate the blower 55 and this causes a more forcible passage of atmospheric or unconsumed air to the combustion chamber and therefrom through flues 3 and 4 successively. The passages for the combustion air should be made of such sufficient cross section or area as to facilitate this preheating combustion and later the normal combustion.

I have shown both a gaseous fuel and liquid fuel supply, for the dual reason that a gaseous fuel will facilitate an ignition and fuel vaporizing and the precombustion mentioned, and since I wish to show that either gaseous or liquid fuel may be used with my system, or both, and in the event only one type is used the control or valve for the other may be eliminated. Preferably I use both for the reasons stated.

At the inception of water delivery through functioning of the motor 46—47, the pressure is low in chamber 16 and not sufficient to move piston 21 outwardly, but a very brief operation of motor 46—47 suffices to pump sufficient water into chamber 16 to raise the pressure to near a normal pressure since the orifice 15 is relatively small and does not permit rapid passage of water except under relatively high pressure, and thus the piston 21 is quickly subjected to the high pressure and moved to permit passing of the gaseous fuel to the combustion chamber and also to close the needle valve 25 upon the outlet to by-pass 35 so that the by-passing of the liquid fuel pumped is stopped and liquid fuel through nozzle 34 then commences. Therefore under all conditions except that of a pressure approaching normal water delivery pressure, the by-pass 35 is open, and liquid fuel delivery to nozzle 34 will not be effective, and also at the same time gaseous fuel delivery from gas main 29 will not be effective, as delivery therefrom is permitted or stopped simultaneously as delivery from liquid nozzle 34 is permitted or stopped.

While I have shown particular devices and combinations of devices in the illustration of my invention I contemplate that other detailed devices and combinations of devices may be utilized in the realization of my invention without departing from the spirit and contemplation of my invention.

What I claim is:

1. A heating system associated with a house interior space and comprising in combination, a boiler and combustion chamber therefor, an electric motor operated water pressure delivery means, a thermostatic control subjected to temperature conditions induced by said heating system in said space for the control of the operation of the electric motor by current from a current supply, a fuel supply means to supply fuel to the combustion chamber, a pressure responsive means subjective to pressure created by the water pressure delivery means, a control means for the fuel supply means subjective to determination of its control by the pressure responsive means, a connection from the water pressure delivery means to the boiler for the supply of the boiler with generating fluid, a steam motor receiving steam from the boiler, a house heating means receiving exhaust steam from the steam motor, an air blower for the combustion chamber delivering air thereto and driven by the steam motor.

2. A house heating system associated with a house interior space and comprising in combination, a boiler and combustion chamber therefor, an electric motor operated water pressure delivery means, a thermostatic control subjected to temperature conditions induced by said heating system in said space for the control of the operation of the electric motor by current from a current supply, a fuel supply means to supply fuel to the combustion chamber, a pressure responsive means subjective to pressure created by the water pressure delivery means, a control means for the fuel supply means subjective to determination of its control by the pressure responsive means, a connection from the water pressure delivery means to the boiler for the supply of the boiler with generating fluid, a steam motor receiving steam from the boiler, a steam heating means for said space receiving steam from the steam motor, an air blower driven by the steam motor and moving air in a hot air heating means for said space.

3. In a heating system, a furnace, means associated with the furnace for heating a liquid, individual radiator or heating units in an associated house heating system and a conduit for conveying vaporized liquid from the liquid heating means to the individual heating units, vapour gas driven means interposed in the conduit and driven by the flow of vapour gas, in combination with means for delivering liquid to the liquid heating means, and electric motor means driving said means delivering liquid and a temperature condition control means controlling the passing of electric current to said electric motor means in accordance with the need of heat from said heating system, and in combination air blowing means driven by the vapour gas driven means and adapted for receiving fresh air from outside atmosphere and delivering the air to house rooms heated by said heating system.

4. In a heating system, a furnace, means associated with the furnace for heating a liquid, individual radiator or heating units in an associated house heating system and a conduit for conveying vaporized liquid from the liquid heating means to the individual heating units, vapour gas driven means interposed in the conduit and driven by the flow of vapour gas, in combination with means for delivering liquid to the liquid heating means, and electric motor means driving said means delivering liquid and a temperature condition control means controlling the passing of electric current to said electric motor means in accordance with the need of heat from said heating system, and in combination heating flues through which combustion products from said furnace pass to a discharge vent, air blowing means driven by said vapour gas driven means and adapted for circulating air of the house rooms heated by said system from said rooms through conduits passing said heating flues and returning the air as heated to the rooms and adapted for receiving fresh air from outside atmosphere and passing said fresh air by said last named heating flues to said rooms, and automatic combustion products by-passing means for causing said combustion products to by-pass said heating flues and to discharge directly to said discharge vent in a steam generating preheating period and after the said preheating period to pass through said heating flues to said discharge vent.

5. In a heating system for building interior space, a heat interchanging means including an exhaust passage and air passage in heat interchanging relationship, a furnace, a vapor generator means associated with said furnace for heating a liquid, means associated with said furnace and vapor generator means for procuring combustion and passing the products of combustion after intermediate heating of said vapor generator means through said exhaust passage, individual radiator or heating units in said space, a conduit for conveying vaporized liquid from said liquid heating means to the individual heating units, vapour gas driven means interposed in the conduit and driven by the flow of vapour gas, an air blower operated by said vapour gas driven means and air directing means associated with said air blower and air passage to direct air moved by said blower through said air passage for heating therein, pressure liquid delivery means for the liquid heating means and fuel delivery means for the furnace, electric motor means for driving said pressure liquid delivery means and said fuel delivery means, and a current source and current control for said electric motor means said control comprising a temperature moved member subject to the air of said space, an electric circuit through said electric motor adapted to be closed and broken by movements of said member to drive said electric motor when said air is under a predetermined minimum temperature, said control comprising also a chronometrically operated member and an electric circuit through said electric motor adapted to be closed and broken by said chronometrically operated member periodically to procure operation of said means procuring combustion and thereby vapor generation to procure operation of said air blower by said vapour gas driven means during periodically determined intervals of time, and fresh air induction means in association with said air directing means to permit fresh air induction for heating in said air passage and delivery to said space.

6. In a heating system for rooms in a building, a furnace, means associated with said furnace for heating a liquid, individual radiator or heating units in said rooms, a conduit for conveying vaporized liquid from said liquid heating means to the individual heating units, vapour gas driven means interposed in the conduit and driven by the flow of vapour gas, pressure liquid delivery means for the liquid heating means and fuel delivery means for the furnace, electric motor means for driving said pressure liquid delivery means and said fuel delivery means, a thermostatic control subjected to temperature of air of said rooms and controlling passing of current to said electric motor means, and in combination heating flues through which combustion products from said furnace pass to a discharge vent, air blowing means driven by said vapour gas driven means and adapted for circulating air of the building rooms heated by the heating system from said rooms through conduits passing said heating flues and returning the air as heated to the rooms.

7. In a heating system for rooms in a building, a furnace, means associated with said furnace for heating a liquid, individual radiator or heating units in said rooms, a conduit for conveying vaporized liquid from said liquid heating means to the individual heating units, vapour gas driven means interposed in the conduit and driven by the flow of vapour gas, pressure liquid delivery means for the liquid heating means and fuel delivery means for the furnace, electric motor means for driving said pressure liquid delivery means and said fuel delivery means, a thermostatic control subjected to temperature of air of said rooms and controlling passing of current to said electric motor means, and in combination heating flues through which combustion products from said furnace pass to a discharge vent, air heating conduits in association with said heating flues, air blowing means driven by said vapour gas driven means and fresh atmospheric air induction means in association therewith, whereby fresh atmospheric air is inducted and passed through said air heating conduits for heating by said heating flues and delivery to said rooms.

8. In a heating system for rooms in a building, a furnace and fuel supply means therefor, means associated with the furnace for heating a liquid, individual radiator or heating units in an associated building heating system and a conduit for conveying vaporized liquid from the liquid heating means to the individual heating units, vapour gas driven means interposed in the conduit and driven by the flow of vapour gas, means for delivering liquid to the liquid heating means, electric motor means driving said means delivering liquid and a temperature condition control means controlling the passing of electric current to said electric motor means in accordance with the need of heat from said heating system, and in combination heating flues through which combustion products from said furnace pass to a discharge vent, air heating conduits in association with said heating flues, air blowing means driven by said vapour gas driven means and adapted for circulating air of the said rooms heated by the heating system from said rooms through said air heating conduits passing said heating flues and returning the air as heated to the rooms; and fresh atmospheric air induction means in association with said air blowing means for passing fresh atmospheric air through said air heating conduits for heating by said heating flues and delivery to said rooms.

9. The method of supplying heat and ventilation to a building interior space, which consists in combusting fuel during thermostatically controlled spaced intervals, electrically motivating the impelling of water supply during such intervals for steam generation by heat of said combustion, the motivating by said steam generation of air impulsion for heating by said combustion and direction to said interior space, the directing of steam from said steam generation after said last named motivating for supplemental heating in said interior space.

10. The method of supplying heat and ventilation to a building interior space, which consists in combusting fuel during thermostatically controlled spaced intervals, electrically motivating the impelling of water supply during such intervals for steam generation by heat of said combustion, the motivating by said steam generation of air impulsion for heating by said combustion and direction to said interior space, the directing of steam from said steam generation after said last named motivating for supplemental heating in said interior space, and the motivating by said steam generation of air impulsion for said combustion.

11. The method of supplying heat and ventilation for a building interior space which consists in combusting fuel during thermostatically controlled spaced intervals, electrically motivating the impelling of water during such intervals for steam generation by heat of said combustion, the motivating by said steam generation of air impulsion for heating by said combustion and direction to said interior space in multiple streams for heating and ventilation in said space, the directing of steam after said steam motivation for supplemental heating by individual steam streams individually included in portions of said space.

12. The method of controlling the supply of heat by fuel combustion for a building interior space by a heating system, which consists in combusting fuel during spaced intervals, controlling combustion during such spaced intervals by pressure of water effecting supply of fuel for such combustion, effecting such pressure of water in such intervals by electric motivating of water impulsion for such pressure effecting, controlling such electric motivating by temperature in said space to initiate or discontinue said electric motivation, the said pressure of water being also effective during said intervals for delivering water for also steam generation by the heat of said combustion, the said steam generation supplying successively power generation and heating in said space.

13. The method of controlling the supply of heat by combustion for a building interior space, by a heating system, which consists in combusting fuel during spaced intervals, controlling the combustion during such intervals by pressure of water effecting supply of fuel for such combustion, effecting such pressure of water in such intervals by electric motivating of water impulsion for such pressure effecting, controlling such electric motivating by temperature in said space to initiate or discontinue said electric motivation, said pressure of water being also effective in such intervals for delivering water for steam generation by the heat of said combustion, said steam generation being effective for steam motivation of air impulsation and in succession for heating in said space, said air impulsation moving air for heating by said combustion and delivery in streams to said space.

14. A heating system associated with a house interior space and comprising in combination, a boiler and combustion chamber therefor, an electric motor operated water pressure delivery means, a thermostatic control subjected to temperature conditions induced by said heating system in said space for the control of the operation of the electric motor by current from a current supply, a fuel supply means to supply fuel to the combustion chamber, a pressure responsive means subjective to pressure created by the water pressure delivery means, a control means for the fuel supply means subjective to determination of its control by the pressure responsive means, a connection from the water pressure delivery means to the boiler for the supply of the boiler with generating fluid, a steam motor receiving steam from the boiler, a house heating means receiving exhaust steam from the steam motor, fresh air induction means driven by said steam motor and forcing said fresh air to said space, and in combination air moving means driven by said steam motor to withdraw air from said space and introduce said withdrawn air to said combustion chamber for combustion air supply.

15. A heating system associated with a house interior space and comprising in combination, a boiler and combustion chamber, an electric motor operating a water pressure delivery means, a fuel pumping means operated by said electric motor and supplying fuel to said combustion chamber, a thermostatic control subjected to temperature induced by said heating system in said space, for the control of the operation of said electric motor by current from a current supply, a pressure responsive means subjective to pressure created by the said water pressure delivery means and adapted to close a fuel by-pass when a predetermined water pressure is maintained by said water pressure delivery means and to open said fuel by-pass when said pressure is not maintained, a connection from the water pressure delivery means to the boiler for the supply of the boiler with generating fluid, a steam motor receiving steam from the boiler, a house heating means receiving exhaust steam from the steam motor, an air blower for the combustion chamber delivering air thereto and driven by the steam motor.

16. A house heating system associated with a house interior space and comprising in combination, a boiler and combustion chamber therefor, an electric motor operating a water pressure delivery means, a fuel pumping means operated by said electric motor and supplying fuel to said combustion chamber, a thermostatic control subjected to temperature induced by said heating system in said space for the control of the operation of said electric motor by current from a current supply, a pressure responsive means subjective to pressure created by the said water pressure delivery means and adapted to close a fuel by-pass when a predetermined water pressure is maintained by said water pressure delivery means and to open said fuel by-pass when said pressure is not maintained, a connection from the water pressure delivery means to the boiler for the supply of the boiler with generating fluid, a steam motor receiving steam from the boiler, a steam house heating means for said space receiving steam from the steam motor, an air blower driven by the steam motor and moving air in a house heating and ventilating for said space.

17. In a heating system associated with a building interior space, a furnace, means associated with the furnace for heating a liquid, individual radiator or heating units in an associated house heating system and a conduit for conveying vaporized liquid from the liquid heating means to the individual heating units, vapour gas driven motor means interposed in the conduit and driven by the flow of vapour gas, heat exchanging means receiving combustion gases from said furnace and discharging therefrom to atmosphere and air forcing means driven by said vapour gas driven motor means to move air through said heat exchanging means for heating by said combustion gases through heat interchange therein and for delivery therefrom to said space, in combination with a thermostatic control subjected to temperature in said space as affected by said heating system, and electric motor operated pumping means forcibly delivering liquid to said liquid heating means, and means procuring combustion in said furnace during the periods when temperature determined by said thermostatic control is below a predetermined minimum temperature.

18. In a heating system for building interior space, a furnace, means associated with the furnace for heating a liquid, individual radiator or heating units in an associated house heating system and a conduit for conveying vaporized liquid from the liquid heating means to the individual heating units, vapour gas driven means interposed in the conduit and driven by the flow of vapour gas, ventilation forcing means driven by said vapour gas driven means, pressure liquid delivery means for the liquid heating means and fuel delivery means for the furnace, electric motor driving means for driving said pressure liquid delivery means and said fuel delivery means, and a thermostatic control subjected to temperature in said space affected by said heating system and controlling passing of current to said electric motor means in combination with pressure responsive control means causing cessation of said liquid and fuel delivery upon excess of a predetermined maximum pressure in said vaporized liquid conveying conduit to which said last named control is subject.

19. In a heating system associated with a building interior space, a furnace, means associated with the furnace for heating a liquid, individual radiator heating units in an associated heating system and a conduit for conveying vaporized liquid from the liquid heating means to the individual heating units, vapour gas driven means interposed in the conduit and driven by the flow of vapour gas to said heating units, means for delivering liquid to the liquid heating means, a thermostatic control subjected to temperature of said space affected by said heating system, means associated with said thermostatic control for procuring combustion in said furnace and vapour generation during periods when temperature determined by said thermostatic control is below a predetermined temperature, in combination with heating flues through which combustion products from said furnace pass to a discharge vent, air movement directing means associated with said heating flues and with said space and with fresh air induction means, air blowing means driven by said vapour gas driven means and forcibly moving air from said space or from said fresh air induction means through said air movement directing means for heating by said heating flues and delivery to said space.

20. In a combined hot air and steam heating system, the combination of a steam generator, combustion means associated with said generator, exhaust means providing a passage for the products of combustion from said generator, air passage means associated with said exhaust means and in heat exchange relationship therewith, a steam turbine and radiator means associated with said generator whereby steam is supplied sequentially to said turbine and to said radiator means, and air blower means driven by said turbine for forcing air through said air passage means.

21. In a combined hot air and steam heating system, the combination of a steam generator, combustion means associated with said generator, exhaust means providing a passage for the products of combustion from said generator, air passage means associated with said exhaust means and in heat exchange relationship therewith, a steam turbine and radiator means associated with said generator whereby steam is supplied sequentially to said turbine and to said radiator means, and air blower means driven by said turbine for forcing air through said air passage means, and thermostatic control means subjective to temperature of space heated by said system for procuring said supply of steam to said turbine and radiator means when the temperature of said space is under a predetermined minimum.

22. In a combined hot air and steam heating system, the combination of a steam generator, combustion means associated with said generator, exhaust means providing a passage for the products of combustion from said generator, air passage means associated with said exhaust means and in heat exchange relationship therewith, a steam turbine and radiator means associated with said generator whereby steam is supplied sequentially to said turbine and to said radiator means, and air blower means driven by said turbine for forcing air through said air passage means, and in combination fresh atmospheric air induction means associated with said air blower means whereby fresh atmospheric air may be inducted thereby and passed through said air passage means.

23. In a heating system associated with house rooms, a furnace having associated therewith a source of fuel and air for combustion therein, a generator associated with said furnace for heating a liquid, individual radiator heating units in an associated radiator heating system and a conduit for conveying vaporized liquid from the liquid heating means to the individual radiator heating units, vapor gas driven means interposed in the conduit and driven by the flow of vapor gas, means for delivering liquid to the liquid heating generator, and electric motor means driving said means delivering liquid and a temperature condition control means controlling the passing of electric current to said electric motor means in accordance with the need of heat from said heating system and in combination heating flues through which combustion products pass from said furnace and generator to a discharge vent, air blowing means driven by the vapor gas driven means and organized for receiving fresh air from atmosphere and passing the air adjacent the heating flues through air passage means associated therewith for heat absorption therefrom and for passing such air as heated to house rooms heated by said heating system.

24. The means described in claim 19 and in combination means for manually controlling the admission of fresh air through said fresh air induction means.

25. The novel means described in claim 17 and in combination a supplementary control for procuring combustion in said furnace and said vapor generation periodically during chronometrically determined intervals of time and fresh air induction means permitting fresh air induction whereby said air forcing means procures forced ventilation during said intervals of time.

ADOLPHE C. PETERSON.